United States Patent [19]
Pellenc et al.

[11] Patent Number: 5,778,946
[45] Date of Patent: Jul. 14, 1998

[54] APPARATUS FOR PLACING TIES, FOR EXAMPLE, FOR TYING VINES

[75] Inventors: Roger Pellenc, Pertuis; Jose Montoya, Villelaure; Philippe Gilbert, Pertuis, all of France

[73] Assignee: Pellenc (Societe Anonyme), Pertuis, France

[21] Appl. No.: 712,422

[22] Filed: Sep. 11, 1996

[30] Foreign Application Priority Data

Sep. 12, 1995 [FR] France .................. 95/10929

[51] Int. Cl.⁶ .................................. B21F 15/04
[52] U.S. Cl. .................................. 140/119; 57/93.6
[58] Field of Search .................. 140/57, 93 A, 140/119, 93.6

[56] References Cited

U.S. PATENT DOCUMENTS

| | | | |
|---|---|---|---|
| 1,671,456 | 5/1928 | Thompson | 140/119 |
| 2,945,514 | 7/1960 | Wyss | 140/93 R |
| 3,810,495 | 5/1974 | Pack | 140/93 A |
| 4,153,082 | 5/1979 | Foley | 140/93 D |
| 4,354,535 | 10/1982 | Powell et al. | 140/119 |
| 4,362,192 | 12/1982 | Furlong et al. | 140/119 |
| 5,394,644 | 3/1995 | Ballu | 47/1.01 |
| 5,431,196 | 7/1995 | Forrester, Jr. et al. | 140/119 |

FOREIGN PATENT DOCUMENTS

| | | | |
|---|---|---|---|
| 346639 | 11/1978 | Austria . | |
| 554705 | 1/1960 | Belgium . | |
| 1504378 | 2/1968 | France . | |
| 2221239 | 10/1974 | France . | |
| 2317052 | 2/1977 | France . | |
| 2420624 | 11/1979 | France | 140/57 |
| 2701739 | 8/1994 | France . | |
| 8302801 | 3/1985 | Netherlands . | |
| 554050 | 4/1977 | U.S.S.R. | 140/57 |
| WO 93/14622 | 8/1993 | WIPO . | |

OTHER PUBLICATIONS

Derwent Abstract of Netherlands No. 8302801, Class P13, An 85-079155 [13], Derwent Publications Ltd., London.

*Primary Examiner*—Lowell A. Larson
*Attorney, Agent, or Firm*—Greenblum & Bernstein P.L.C.

[57] ABSTRACT

An apparatus for placing ties, for example for tying vines. The apparatus includes a mechanism for feeding an initial portion of a filiform band; a rotatable twister positioned at the front of the device provided with two openings for engaging two parts of the initial portion of the band; a cutting arrangement positioned upstream from one of the openings of the twister; a hinged guide positioned at the front of the device; a motor and a transmission system designed to be alternately active or inactive in order to execute, respectively, (1) the operation of the feeding mechanism, the hinged guide, and the cutting system, while the rotating twister is at a stop; and (2) the driving in rotation of the twister while the feeding mechanism, the hinged guide, and the cutting system are de-activated.

38 Claims, 9 Drawing Sheets

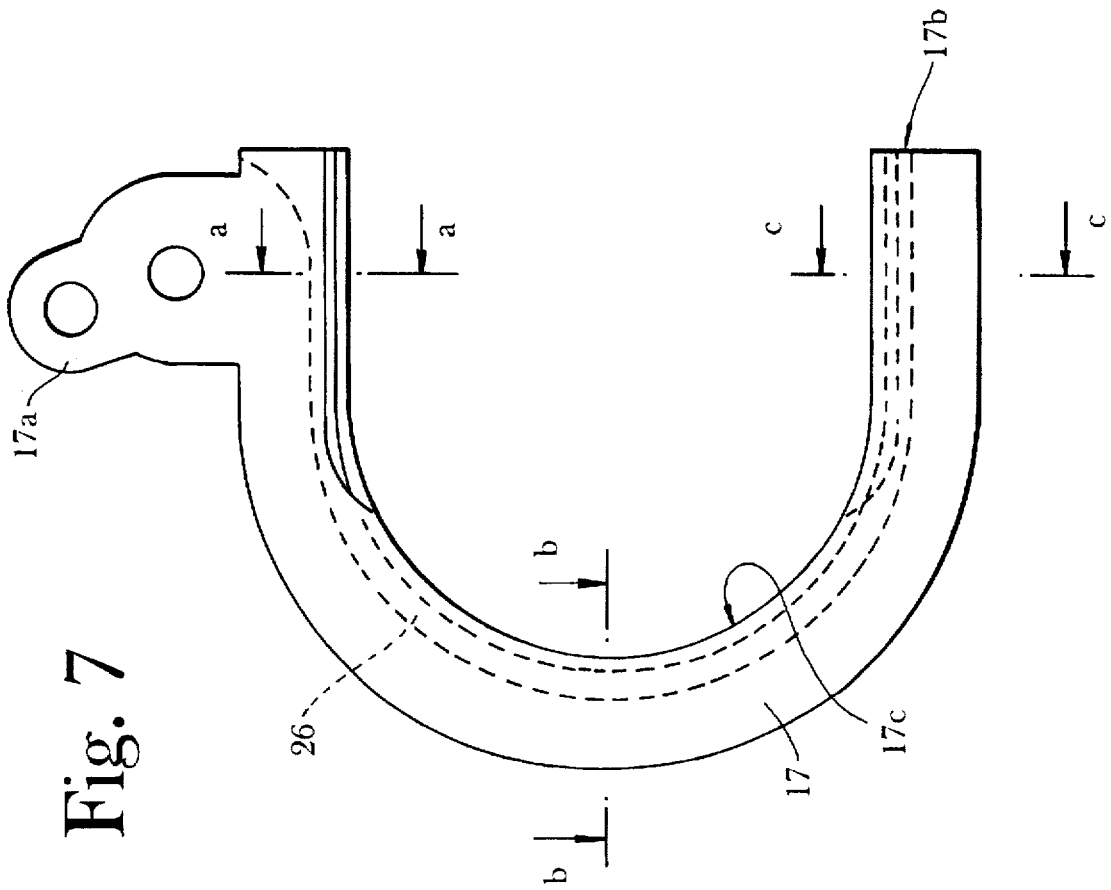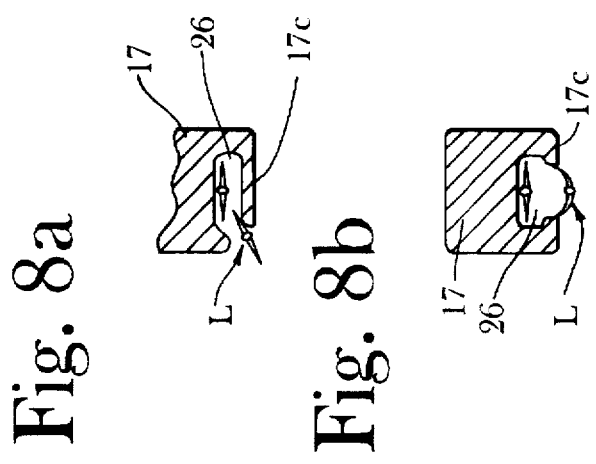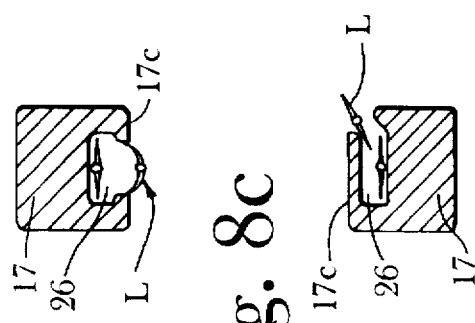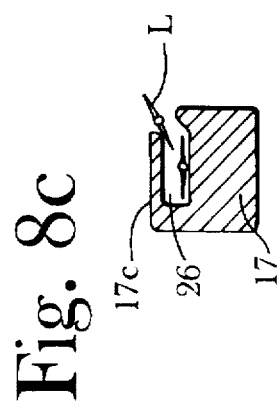

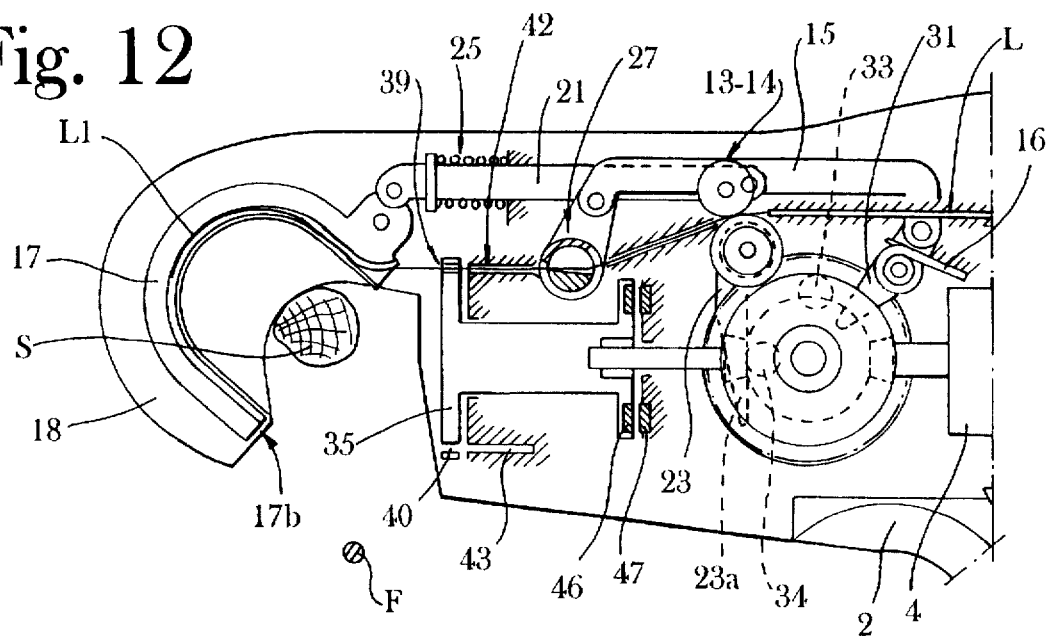
Fig. 12
Fig. 13
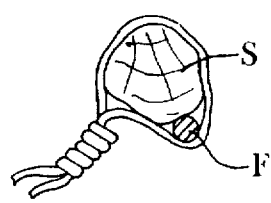
Fig. 14

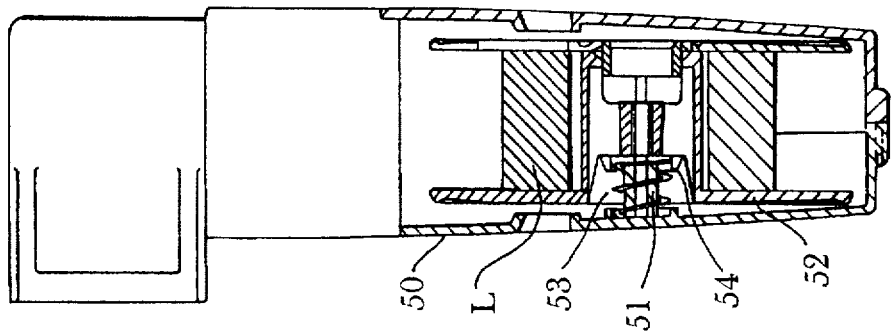
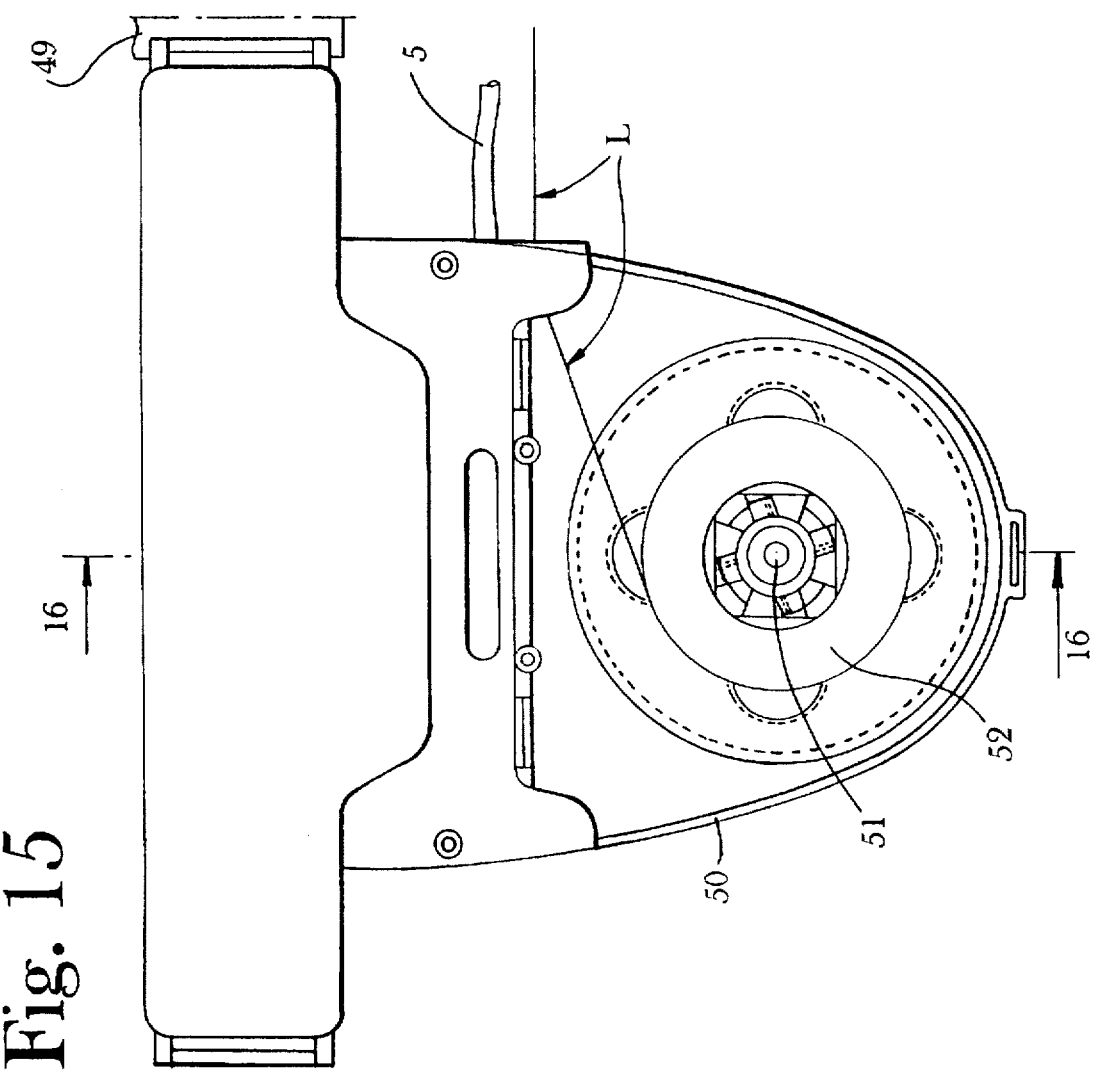

APPARATUS FOR PLACING TIES, FOR EXAMPLE, FOR TYING VINES

BACKGROUND OF THE INVENTION

1. Field of the Invention

The present invention relates to an apparatus for the placement of ties and, more particularly, to a tying gun. According to one very advantageous application, the invention can be employed in the tying of small branches or boughs of trees, bushes, or shrubs onto supporting wires or stakes such as vine shoots, for example, onto training wires. However, other worthwhile applications can be envisioned such as, for example, the tying of plants to stakes, the tying of netting to posts, the closure of bags, the binding of reinforcing bars for reinforced concrete, etc.

2. Description of Background and Relevant Information

In the field of viticulture, the tying of vines is a lengthy and tedious operation which requires a great deal of manual labor. In fact, according to the characteristic cultivation techniques of every viticultural region, and with reference to FIGS. 1 and 2, it is necessary for each vine stock P each year, to have one to four shoots S, which will bear fruit the next year, tied to one to three steel wires F designed to serve as supports and guides, by means of two to four ties A for each branch. Using the cultivation technique in question, it is thus necessary to perform from 9,000 to 80,000 ties per hectare.

Currently, this tying is performed either:

with twine tied by hand; or with ties of various configurations, tied manually or with the aid of appropriate tools, which hardly meet the speed and maneuverability criteria which could result in a real gain in productivity.

For example, there are known tying devices which use a filiform band constituted by a metal wire of small diameter, covered with paper or plastic, by means of which a portion of this band is disposed around a shoot and a supporting wire, which portion of the band is then cut and its two ends are twisted together to create a tie.

The present invention, described in detail below, relates to hand-held devices of this type.

Such devices are described, for example, in the following documents: French Patent Publication Nos. 1,504,378, 2,221,239, and 2,701,739.

The devices described in French Patent Publication Nos. 1,504,378 and 2,221,239 are quite rudimentary; they are not motor-driven and their operation is exclusively manual.

Under these conditions, they provide no significant improvement in efficiency, and no appreciable reduction in the expenditure of muscular energy required to perform the work of tying vines or attaching arborescent or climbing plants to stakes.

The device described in French Patent Publication No. 2,701,739 provides no definitive improvement over the crude devices disclosed in the two aforementioned documents. It is, in effect, a semi-automatic device, that is, a device which performs only part of the tying operation in an automatic, motor-driven way, which operation is carried out in successive steps requiring two manual operations for closing the jaws of this device, so that the time savings obtained when attaching vines is fairly insignificant, while the repeated operations for closing the two arms equipped with the jaws rapidly results in muscular fatigue, which at best reduces efficiency or at worst encourages the development of tendinitis.

Furthermore, the use of this device requires the execution of precise movements and, consequently, requires a certain dexterity, so that its utilization seems to be restricted to experienced operators. It must be remembered, as indicated previously, that wine growers select, for each vine stock, one, two, or three branches (depending upon the cultivation method) which will bear fruit the next year, and all the other branches are cut off. It is therefore essential not to break or hurt the branches retained for fructification.

In summary, while there are existing tools which make it possible to perform a mechanized tying of vines, the time required for the placement of a tie is still relatively lengthy (at best, on the order of 4 to 10 seconds), for an experienced operator, and this is true no matter what techniques or materials are used. Given the considerable number of ties to be performed, the cost of the manual labor assigned to this task is still very high.

SUMMARY OF THE INVENTION

An object of the present invention, therefore, is to remedy the various drawbacks resulting from the known state of the art.

According to the invention, this objective is achieved by means of a hand-held device or tying gun which uses a filiform band, which device comprises: a mechanism for feeding an initial portion of the band issuing from a supply source; a rotating twister disposed at the front part of the device and provided with two openings for engaging two parts of this initial portion; a cutting system disposed upstream from one of the openings of the twister relative to the feed direction of the band; a hinged guide disposed at the front end of this device, the outlet of which can be moved into a position opposite the second opening of the twister; a driving mechanism and a transmission system designed to be alternatively active or inactive, so as to produce, alternately:

either the operation of the feeding means, the hinged guide and the cutting system, while the rotating twister is at a stop; or the driving in rotation of this rotating twister, while the feeding mechanism, the hinged guide and the cutting system are de-activated.

Using this device, it is possible to produce twist ties in a way that is very easy and extremely fast. This device makes it possible to double, or even triple, the efficiency of operators charged with tying vines as compared to the manual or mechanized techniques practiced to date. The device according to the invention makes it possible, in effect, to place from 20 to 30 ties per minute, with one hand holding the tying gun while the other hand holds the wood to be tied in position.

According to another advantageous characteristic of the invention, the mechanism for driving the device is comprised of a single electric motor with two directions of rotation and the transmission system comprises two clutch devices designed to be alternately active or inactive, one of which devices ensures the communication of the motor movement to the band feeding system, the hinged guide and the cutting system, while the other does not transmit any motor movement to the rotating twister, and vice-versa.

Due to this design, the device is light and not very bulky.

According to another very advantageous characteristic of the invention, the device includes a hook-shaped tip immovably disposed at the front end of this device, which hooking tip delimits an opening, and the hinged guide is mounted so that it can pivot around this opening.

Due to this feature, the operator can grasp a branch or shoot by means of the fixed front hook of the device, bring it into contact with the supporting wire and place the tie simply by pressing a trigger which controls the power supply to the motor, thus ensuring a complete operating cycle of the device.

It is to be understood that this design greatly facilitates the action for bringing the shoot into proximity with the supporting wire, and that the placement of ties can potentially be done with only one hand.

It is further to be understood that, due to the invention, it is possible to produce a new generation of self-contained, hand-held tying devices which are particularly advantageous for the work of mechanical vine tying, no matter what cultivation technique is used for the vines. These devices, whose operation is motor-driven and controlled by an electronic system such as a microprocessor integrated on a printed circuit board, for example, housed in the handle of the tool, make it possible to perform the actual tying operation in less than one second (0.2 seconds). The device according to the invention therefore enables extremely large gains in productivity due to the reduction in the time required for the execution of the tying operations. Moreover, the device according to the invention is in the form of a gun which is relatively light (about 700 grams) and easy to handle, so that the tying operations can be carried out with less fatigue. Its configuration makes its utilization identical for a left-handed or right-handed operator.

The tying device according to the invention is easy to use and its utilization can be simplified by the electronic management of all of its active components. This device may be put to use quickly, no matter who is using it, since it does not require any particular technical knowledge.

The general ergonomics and the design of the device improve the quality of the work of tying vines or other plants, which previously was tedious.

The comfort of using the device makes it possible to achieve a regular work rhythm, no matter what the time of day (the user's fatigue is reduced) or the weather conditions (fewer frozen fingers at the end of the day, since the operator can work with gloves).

BRIEF DESCRIPTION OF THE DRAWINGS

Other characteristics and advantages of the invention will be better understood upon reading the description that follows and with reference to the annexed drawings giving, by way of example, an advantageous, but non-limiting embodiment of the tying device according to the invention.

FIG. 7 is a larger scale front view of the hinged guide hook.

FIGS. 8a, 8b, 8c are sectional views along the lines a—a, b—b, c—c, respectively, in FIG. 7, each of which views shows two positions of the band.

FIG. 12 is a larger scale partial view of FIG. 4 which shows the hinged hook of the device in the open position, before the tying of a shoot to a supporting wire.

FIG. 13 is a corresponding view of FIG. 12, which shows the hook in the closed position at the cutting of the initial portion of the band, before the twisting of the ends of the tie.

FIG. 14 is a view which illustrates the fastening of a shoot to a supporting wire by means of a tie created using the device according to the invention.

FIG. 15 is a front view which illustrates the supply device which supplies the band used to create the ties, and the positioning of this device on a belt.

FIG. 16 is a sectional view along the line 16—16 in FIG. 15.

DETAILED DESCRIPTION OF A PREFERRED EMBODIMENT

Figure 1:
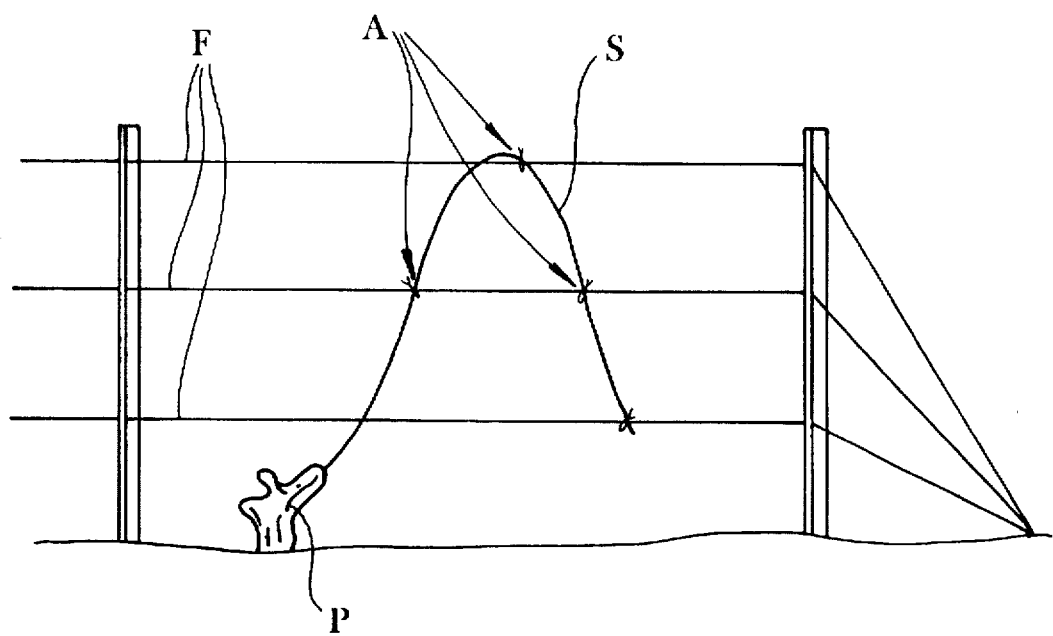
FIGS. 1 and 2 are schematic views which illustrate, by way of example, two methods of cultivation and tying of vines characteristic of two viticultural regions in France.
Figure 2:
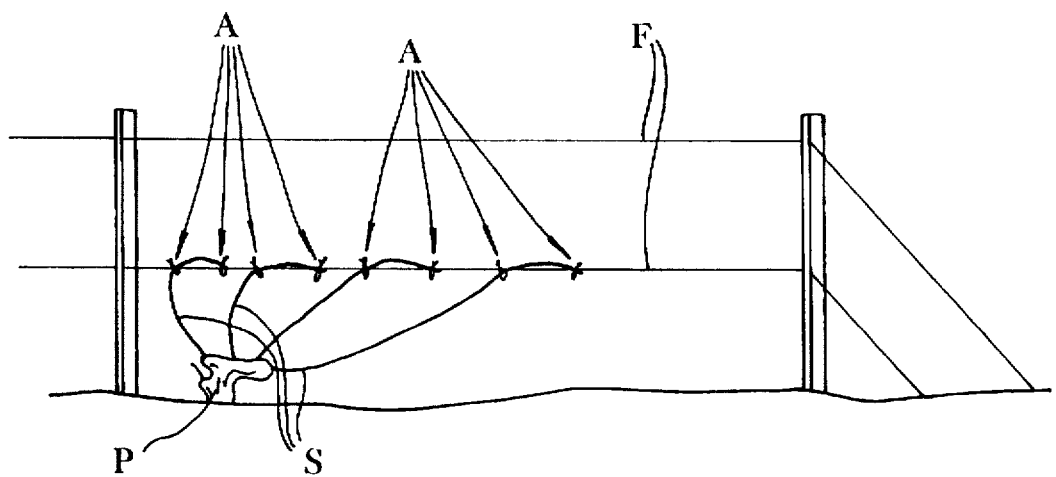

The device of the invention, according to the embodiment disclosed to be described in further detail below, is advantageously produced in the form of a hand-held tool having the general shape of a pistol and comprising a housing or body 1 including a part 1a which extends toward the front and encloses a tying mechanism, a hollow handle 1b equipped with a trigger 2 which makes it possible to operate a switch 2a housed in this handle, which handle is designed to receive a printed circuit board 3 for programming the operation of the device, and a rear part 1c which contains the driving means which drive all of the active elements of the tying mechanism.

Advantageously, and according to a characteristic disposition of the invention, the driving means are constituted by a single direct-current geared motor 4 with two directions of rotation. Preferably, this geared motor can be powered by rechargeable batteries, for example 12-volt or 24-volt batteries, fitted on a belt and connected, by means of an electrical cable 5, to the geared motor 4.

The device comprises mechanism for feeding and guiding a filiform band L issuing from a supply source. This supply source could be constituted by a reel positioned in a chamber provided at the rear part of the housing of the tool. Preferably, however, with reference to FIGS. 15 and 16, and according to a characteristic feature of the invention, the supply source comprises a rigid case 50 that may be fitted on a user's belt 49, for example, which advantageously can be the same belt which carries the batteries for supplying power to the geared motor 4. The case 50 comprises an axle 51 which allows the rotatable mounting of a reel 52 of banding L. Braking means, for example constituted by a spring 53, resist the free rotation of the reel 52 mounted on the axle 51. This spring, which acts by compression, can be mounted around the axle 51 and lodged, by means of its opposite ends, against the internal wall of the case 50 on the one hand, and against a brake rim 54 designed to come to rest against the reel 52 installed on the axle 51, on the other hand.

Due to this design, the band is not unrolled by the mechanism which feeds the band into the device, or by any special means, since unrolling occurs, in effect, from the movements of the operator when his or her arm is extended in the direction of the positions where the ties are to be placed.

The batteries and the reel of banding constitute a relatively light assembly (on the order of 2.3 kg) which can be placed behind the operator by means of the belt 49 equipped with this assembly, thus ensuring self-sufficient tying for several hours.

In the advantageous application of tying vines or other plants, the band is constituted by a metal wire of small diameter covered with biodegradable paper or plastic (for example polypropylene). The metal wire provides strength, while the paper or plastic prevents constriction of the vegetation. After a certain length of time (about 3 months), the covering decomposes and the metal wire, constituted by a highly oxidation-prone material, is covered with rust; the tie produced with such a band is therefore very easily broken with manual cutting, or during the passage of a pre-cutter. This band, for example, is in the form of a flat wire with a width on the order of 3 to 4 mm and a thickness at its center where the metal wire is located on the order of 0.5 mm.

Figure 3:
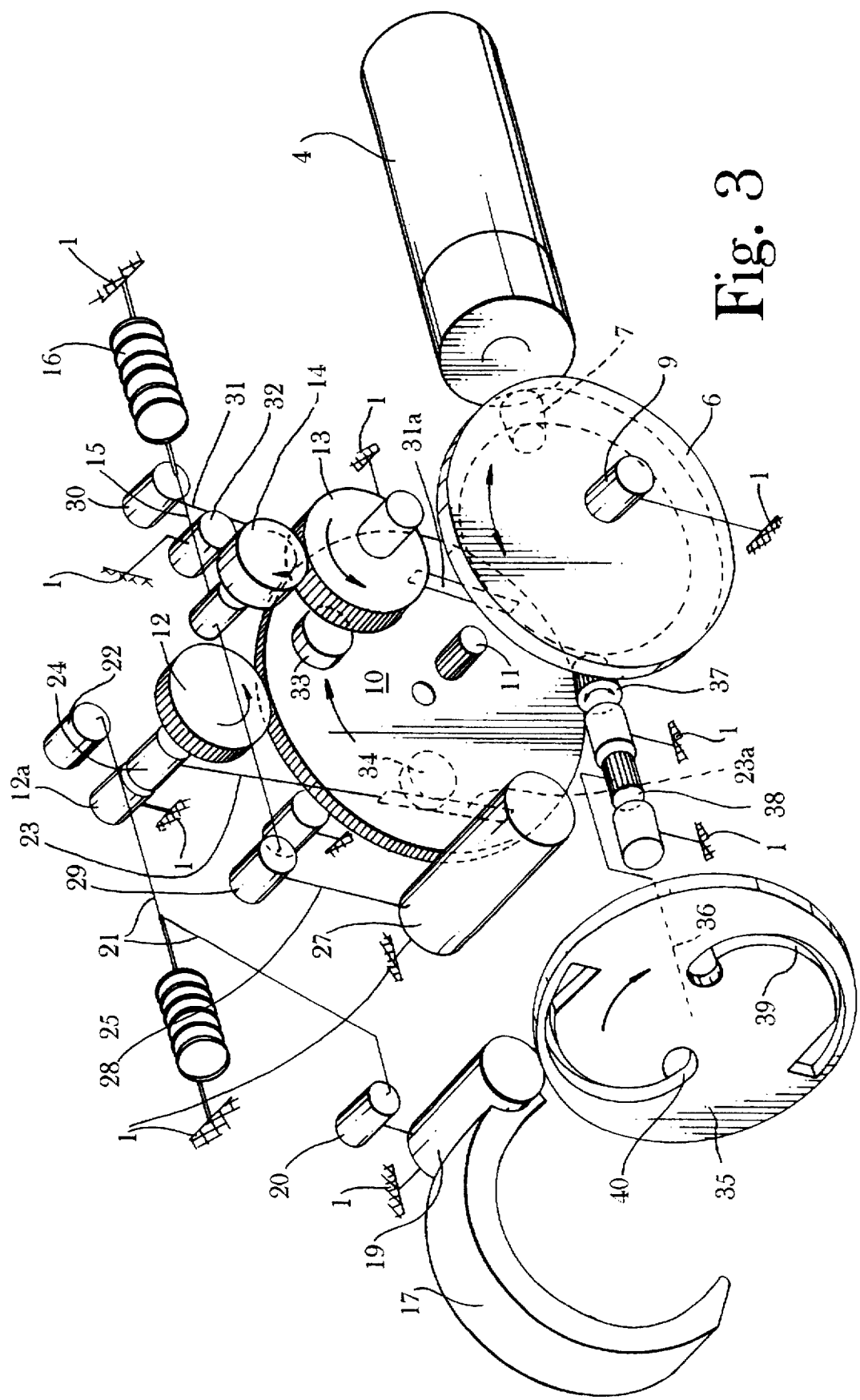
FIG. 3 shows a kinematic representation of the tying device according to the invention, i.e., a representation of moving parts of the invention.
Figure 4:
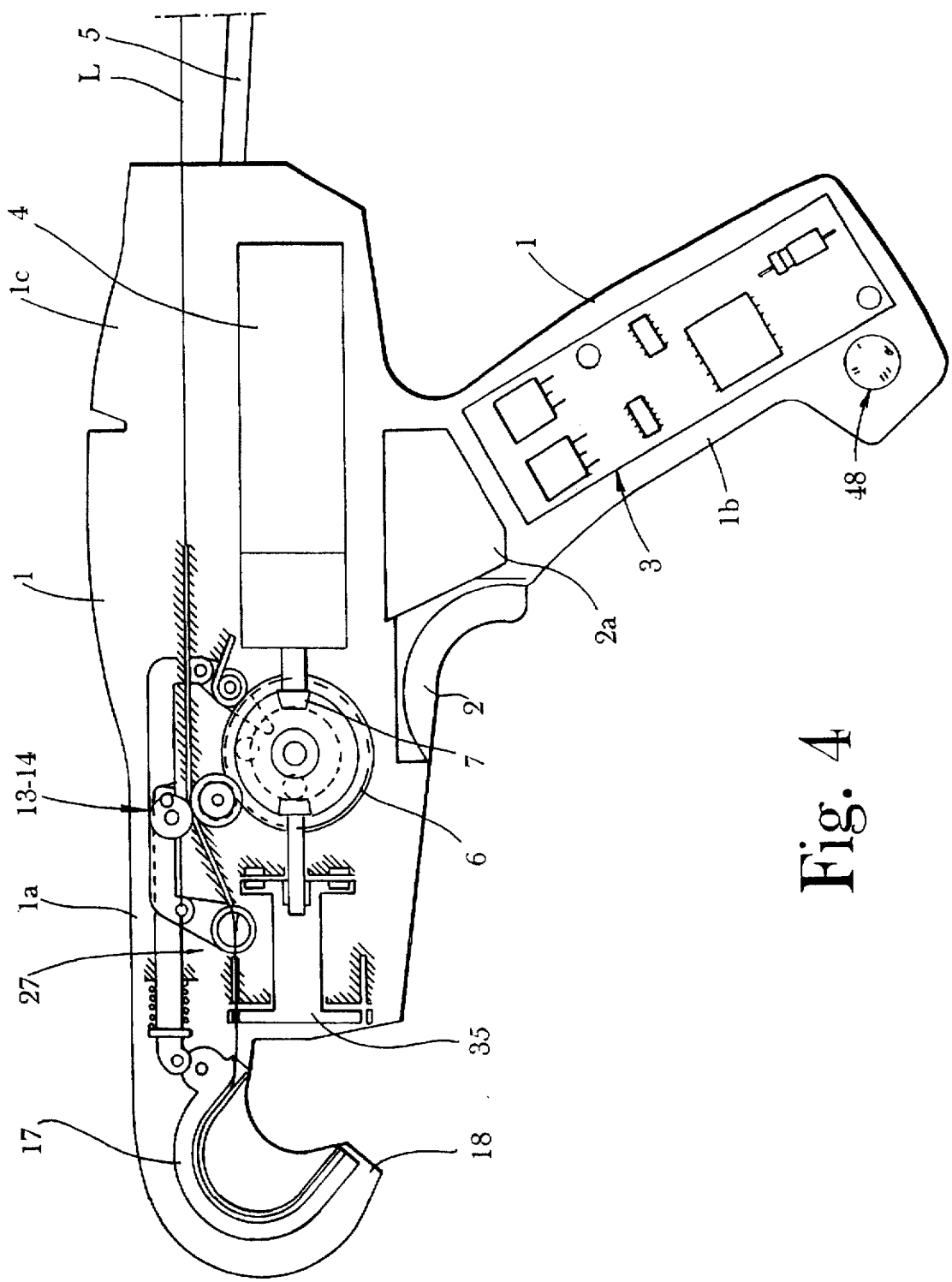
FIG. 4 represents an architectural diagram of the automated operation of this device.

After its entry into the tying gun through an opening provided at the rear of the housing of the gun, the initial portion L1 (see FIGS. 5 and 12) of the band L is fed toward the front of the device by feeding and guiding mechanism operated by the geared motor 4, by means of a transmission comprising a conical-toothed wheel 6 which engages with a bevel gear 7 attached to the output shaft 8 of the geared motor. This wheel 6 is mounted so as to rotate on a fixed axle 9 supported by the housing 1 and the wheel 6 can be coupled with a toothed wheel 10 by means of a first clutch device which can be advantageously constituted by a free wheel 11. See, for example, FIGS. 3 and 6.

The toothed wheel 10 is engaged with a pinion 12 mounted on a fixed axle 12a and integral in rotation with a coaxial roller 13. See, for example, FIG. 3.

A freely rotating support roller 14, mounted on the intermediate part of a movable connecting rod 15, can be pressed against this roller 13. A spring 16 tends to return the rod 15 to the rear into a position in which the support roller 14 is pressed against the roller 13, with the band L passing between these rollers 13 and 14.

At least one of the rollers in the pair of rollers 13, 14 which constitute the mechanism for feeding the band is equipped with peripheral teeth, the toothed roller preferably being the driving roller 13.

The arrangement of the aforementioned assembly is such that when the toothed wheel 6 is coupled with the toothed wheel 10 by means of the free wheel 11, the toothed wheel 6 drives the pinion 12 and the roller 13 in rotation in such a way that roller 13, in cooperation with the roller 14, ensures the feeding of the band L in the direction of the front end of the device.

It is noted that during the passage of the band L between the support roller 14 and the feed roller 13, the teeth of the latter perforate the covering material (plastic or paper) of this band with a multitude of small holes, in such a way that after the placement of the ties, the metal wire will be in contact with air and water through these perforations, which will facilitate its oxidation and subsequent decomposition.

At the outlet of the feeding system 13–14, the band L passes successively into a cutting device and into one of the openings of a twister, which will be described later in the present description.

The band then passes into a hinged guide 17 having the shape of a hook.

Figure 5:
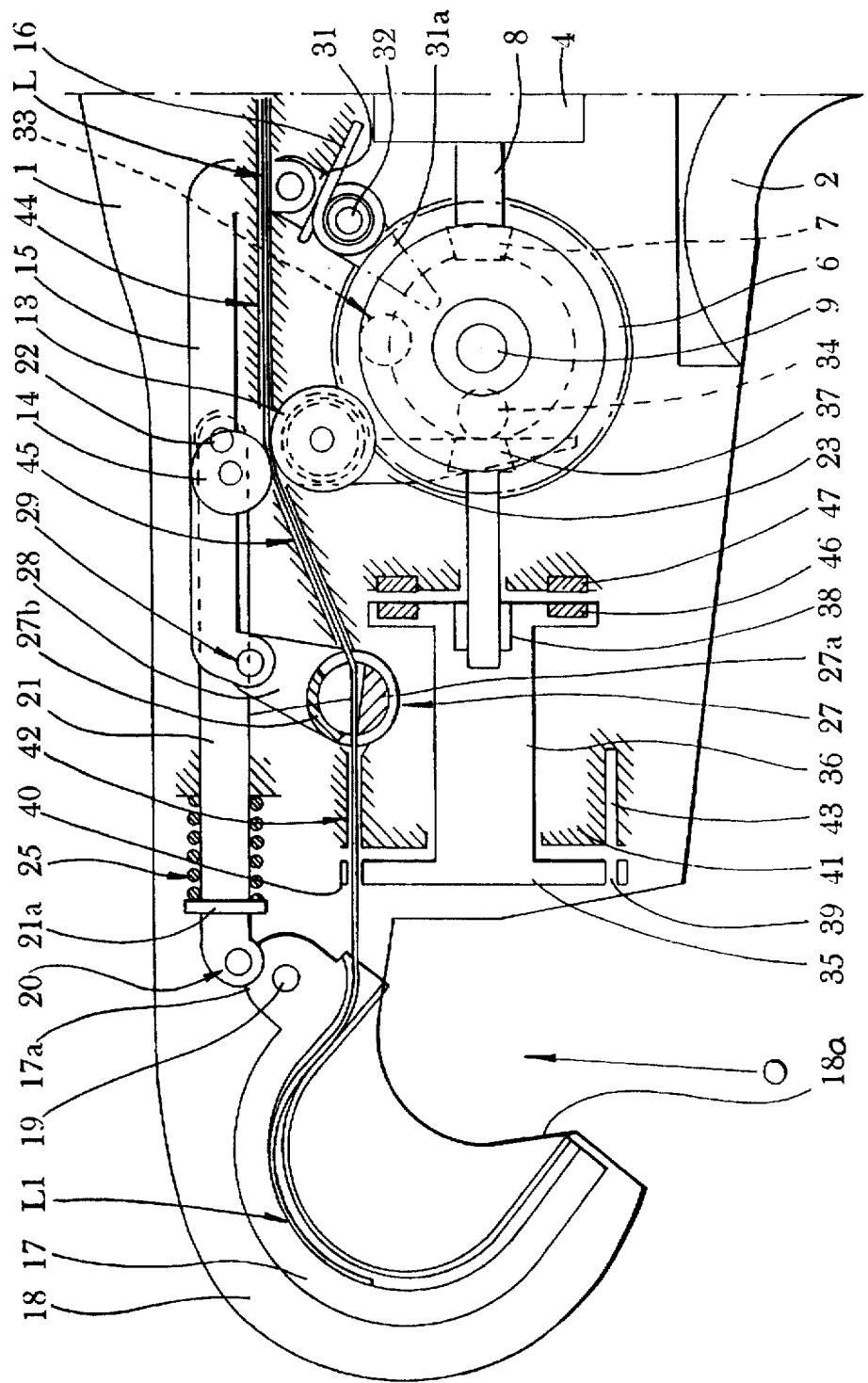
FIG. 5 is a larger scale, partial view of the front part of the tying gun represented in FIG. 4.
Figure 6:
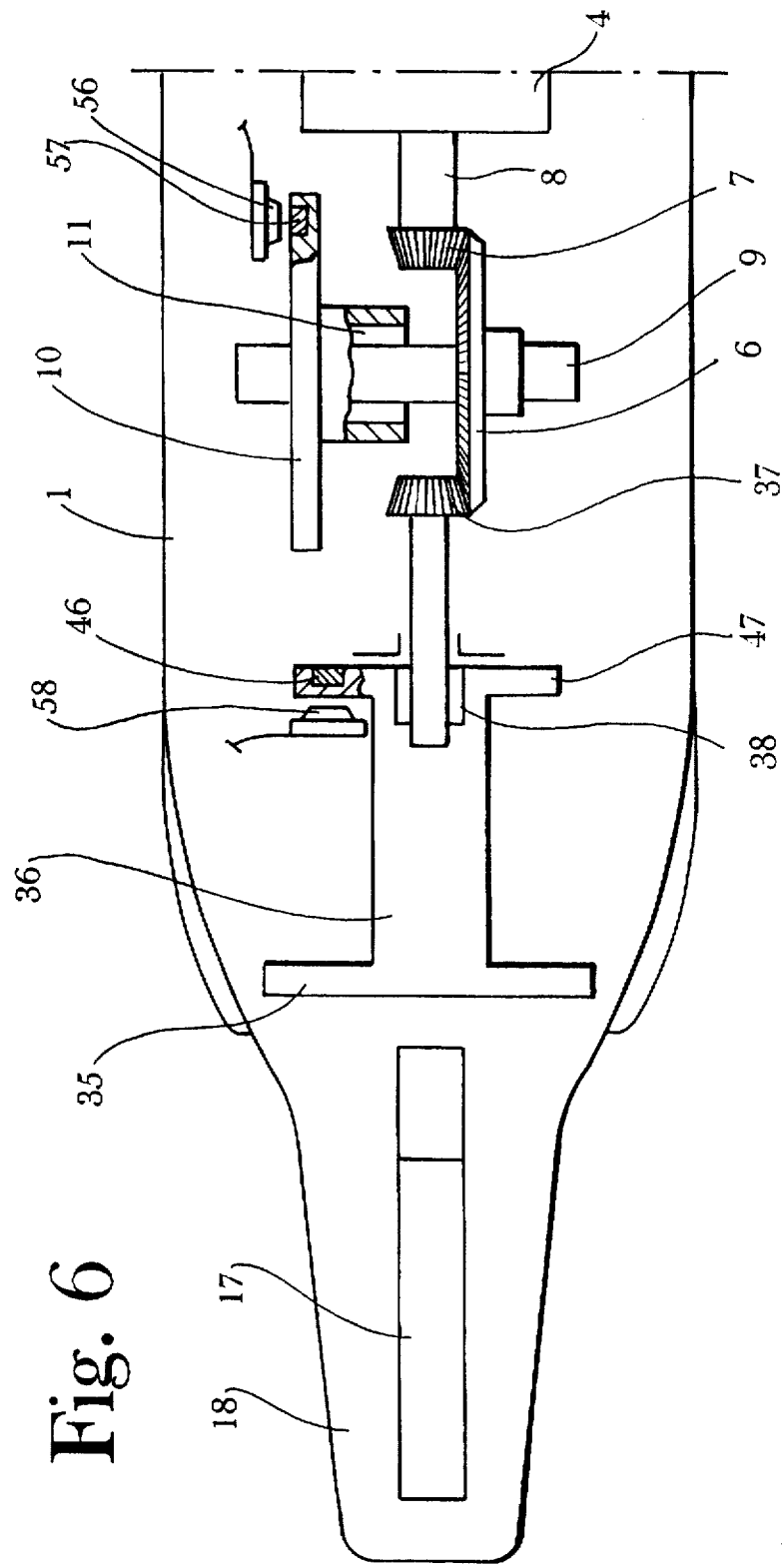
FIG. 6 is a top view which illustrates the positioning of the clutch devices designed to be alternately active or inactive, depending on the direction of rotation of the geared motor.

According to an advantageous aspect of the invention, the front end of the tying gun is equipped with a fixed open hook 18 which can be formed directly by the housing 1 or can be immovably mounted on the front it. With reference to FIG. 5, for example, this fixed open hook or hooking tip 18, by means of its inner curved edge 18a, partially delimits an opening O, and the hinged guide 17 is mounted so that it can pivot around this opening. The hinged guide 17 is mounted in such a way that its inner edge 17c is separated from and is positioned outside the inner edge 18a of the fixed hook 18 when the device is at rest, and is brought closer to this edge so as to close the opening O when the device is in operation.

The guide 17 is mounted so that it can pivot around a fixed axis or axle 19 and it is connected, by means of its rear part in the form of a lever 17a and a hinge 20, to one end of a connecting rod 21 whose other end is connected, by means of a hinge 22, to one end of a lever 23 mounted so that it can pivot around a fixed axis or axle 24.

According to a characteristic feature of the invention, the pivoting of the hinged lever into the closed, operating position, is ensured by a spring.

According to the illustrated embodiment, a spring 25 acting by compression is mounted around an anterior portion of the connecting rod 21, which spring is lodged, by means of its opposite ends, against a fixed point of the housing on the one hand and against a collar 21a which equips the front part of the connecting rod 21 on the other hand, which spring tends to exert a thrust on the lever 17a of the hinged guide hook 17, that is, to cause this guide hook to pivot into the closed position.

The hinged guide, on its curved inner surface, is provided with a guide groove 26, as shown in FIG. 7, shaped so as to hold the tie, while facilitating its out-feeding, during the twisting action as described below. The changing profile of this groove 26 is illustrated in FIGS. 8a, 8b, 8c. As seen in these figures, in the intermediate portion of the hook-shaped hinged guide 17, the groove 26 opens into the median part of the width of the inner curved surface 17c of the hinged guide (FIG. 8b), whereas in the end portions of the guide, the groove opens laterally and in opposite directions.

The cutting system is constituted by a rotating guillotine 27 comprising a fixed element 27a and a pivoting element 27b between which the band L can pass. The fixed element 27a fulfills the function of a bedplate, for example, while the movable element 27b plays the role of a knife, having edge 27b".

Figure 10:
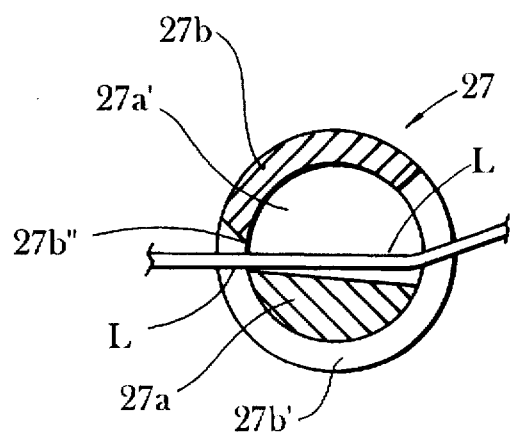
FIGS. 10 and 11 are cross-sectional views which illustrate the feeding of the band through the cutting system and the sectioning, i.e., cutting of this band, respectively.
Figure 11:
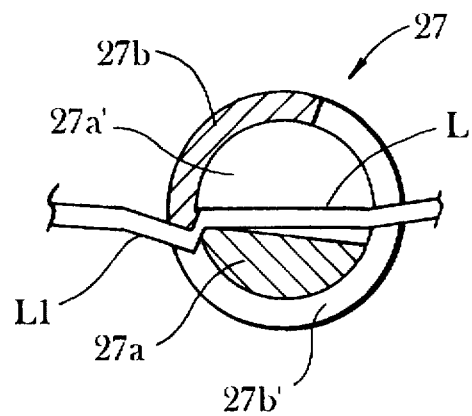
Figure 9:
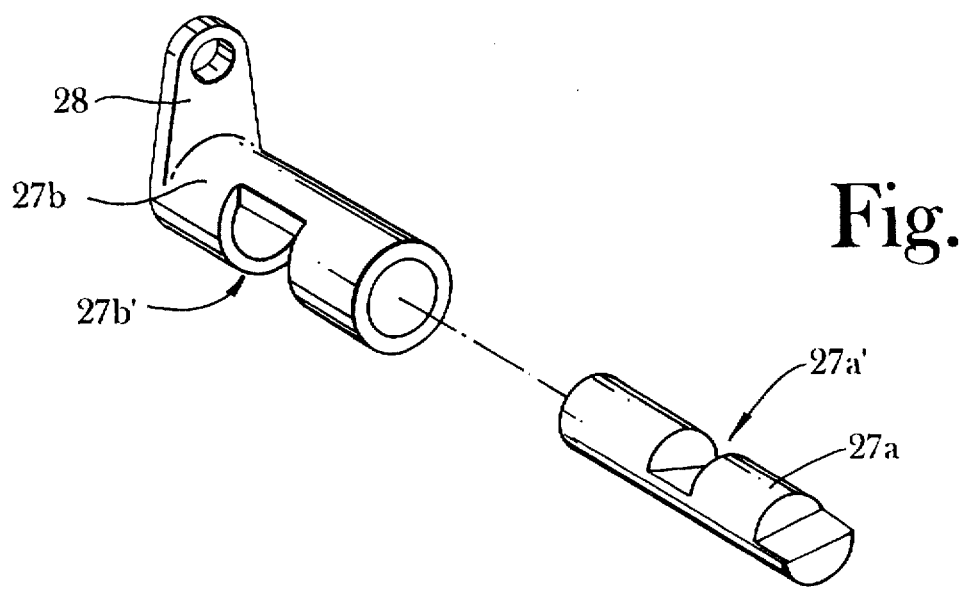
FIG. 9 is an exploded view in perspective of the device which ensures the cutting of the band, upstream from the twister.

As shown in FIGS. 9 through 11 in particular, the movable element 27b is mounted with a rotational latitude of limited amplitude around the fixed element 27a. These elements have a cylindrical shape and they are laterally provided with slots 27b', 27a', respectively, at least one of which extends over more than 180 degrees. The slot 27a' provided in the bedplate 27a, for example, extends over about 210 degrees, while the slot 27b' belonging to the cylindrical knife 27b extends over about 245 degrees. This disposition encourages the advancement of the band L through the guillotine 27, after the sectioning of its initial portion L1, as seen in FIG. 11. In effect, the rotating knife 27b is capable of occupying two positions: a first position in which an opening is created for the passage of the band L through the guillotine 27 (FIGS. 10 and 12) and a second position in which a cutting edge of the slot 27b' cooperates with the adjacent edge of the bedplate 27a to ensure the sectioning of the band (FIGS. 11 and 13). In this position, the space created between the opposing edges of the slot 27b' and the bedplate 27a is enlarged, thus facilitating the advancement of the new end of the band through the guillotine during its return to the open position.

The pivoting knife 27b is rigidly integral with a lever 28 connected by means of a hinge 29 to the front end of the connecting rod 15, whose rear end is connected, by means of a hinge 30, to an operating lever 31 mounted so that it can pivot around a fixed axis or axle 32.

Each of the two opposite surfaces of the toothed wheel 10 is equipped with a cam 33 or 34 oriented parallel to the axle of this wheel.

The free arm 31a of the rocking lever 31 for operating the connecting rod 15 is placed, for example, in the trajectory of the cam 33, while the free arm 23a of the rocking lever 23 is disposed in the trajectory of the cam 34.

The cams 33 and 34 are, for example, spaced at an angle on the order of 95 degrees, in order to allow the band L to be fed into the hinged guide 17 in the meantime.

The twister 35 is in the form of a flat disk and it is integral with an axial shaft 36 oriented toward the rear and connected to a pinion 37 engaged with the toothed wheel 6 by means of a second clutch device and can advantageously be constituted by a free wheel 38.

The axes of the twister 35, the free wheel 38 and the pinion 37 are preferably aligned with the axes of the geared motor 4 and the driving gear 7.

Depending upon the direction of rotation of the geared motor, the free wheel 38 will or will not authorize the rotation of the twister 35.

The twister 35 includes two openings 39 and 40, and its inner surface is disposed at a very small distance (for example on the order of 1 mm) from the flat surface of a fixed part 41 of the body or housing 1 of the device. One of these openings can be placed opposite a passage 42 provided in the fixed part 41, which corresponds with the outlet of the cutting device, while the other opening can be disposed facing a blind hole 43, also provided in the fixed part 41. The passage 42 and the hole 43 are disposed parallel to the axis of rotation of the twister 35, and they are disposed so as to be diametrically opposed relative to this axis.

The openings 39 and 40 are disposed symmetrically. They have an elongated, curved shape which tends to move toward the center of the twister 35, given the direction of rotation of the latter; the advantage of this spiral configuration is explained below.

Guiding passages 44, 45 for the band L are preferably provided in the body or housing 1 of the device between the entrance of the band and the feeding device 13, 14, on the one hand, and between this feeding device and the guillotine cutting system 27, on the other hand.

The groove 26, the passages 42, 44, 45 and the hole 43 have a profile which corresponds to the profile of the band used, that is, according to the example illustrated, a rectangular profile which corresponds to the flat configuration of the band L.

A magnetic indexing system ensures the correct positioning of the twister 35 when the free wheel 38 which allows this twister to be driven in rotation is inactive. This indexing system comprises at least one first magnet positioned on the twister and at least one second magnet immovably positioned on a fixed part of the body of the device. According to the embodiment illustrated, the rear part of the twister, which is disk-shaped, is equipped with two diametrically opposed magnets 46, while two other magnets 47 are immovably installed on a fixed part of the body of the device, opposite the path of the magnets 46, so that when the free wheel 38 is in the "free" state, these rotating magnets 46 come to be placed opposite the fixed magnets 47, thus ensuring the correct positioning of the twister.

The operation of the tool is controlled entirely by the microprocessor card 3 housed in the handle 1b of the device, for example by means of a 4-transistor MOSFET integrated bridge circuit.

Two microsensors, for example of the "Hall effect" type, make it possible to determine the positions of the twister and the advancement of the band. This information is transmitted to the microprocessor, allowing it complete control of the operating cycle.

A first microsensor 56 is disposed, for example, in proximity to the toothed wheel 10 equipped with magnets 57. Likewise, a second microsensor 58 is placed in proximity to the disk-shaped rear part of the twister 35, which is equipped with at least one magnet 46 whose path passes in front of this microsensor 58. Preferably, the microsensor can cooperate with the magnets 46 for this purpose, thus ensuring the correct positioning of the twister.

The microprocessor card 3 also ensures safety, for example current limiting (average and peak). The microprocessor card 3 makes it possible to adapt the operation of the device to the characteristics of the electric current supplied by the batteries (12 volts or 24 volts); the microprocessor card 3 also ensures a re-setting to the start position if any stoppage occurs during the cycle. However, a circuit breaker can replace the current limitation ensured by the microprocessor card, which current-cutting circuit breaker can be placed on the power supply of the motor. The microprocessor card also makes it possible to modify the number of turns to be made by the twister at the request of the operator, who may desire a tighter or looser tie. For this purpose, the device can be equipped with a programmer or selector 48 with several positions, accessible on the handle of the device, which programmer makes it possible to quickly select the number of turns to be made by the twister.

After the elements to be tied (for example a vine shoot S and a supporting wire F) are brought together by means of the fixed hook 18 of the device, the operating cycle of the device comprises the following phases:

closure of the hook 17–18;

advancement of the band L until it penetrates into the hole 43, after having passed through the second opening of the twister 35;

cutting of the band L;

advancement of a new initial portion of the band into the hinged guide 17, until it nears the free end of this guide; and reopening of the hook 17–18.

This operation will be described in further detail below.

At rest (FIG. 12) the hook 17–18 is open, and the hinged guide 17 is housed entirely within the volume delimited by the walls of the fixed hook 18. The initial portion L1 of the band L is engaged in the hinged guide 17, and the free end of this portion is near the free end 17b of this hinged guide. The cam 34 rests on the free arm 23a of the lever 23, so that the connecting rod 21 is in the recoil position, while the spring 25 is compressed. In addition, the magnetic indexing system 46–47 maintains the twister 35 in a position in which its openings 39, 40 are placed opposite the passage 42 and the hole 43.

When the trigger 2 is pressed, the cycle starts.

The geared motor 4 turns in the direction which enables it to operate the means for feeding the band and the cutting system.

The cam 34 of the toothed wheel 10 moves away from its initial position and allows the pivoting of the lever 23 and the advancement of the connecting rod 21 under the action of the spring 25, which ensures the pivoting of the guide 17 and the closure of the hook 17–18 around the shoot S and the supporting wire F.

It is noted that the utilization of a properly calibrated spring (spring 25) to obtain the closure of the hook 17–18 makes it possible to avoid harming the shoot in case it inopportunely falls within the trajectory of the guide hook 17.

The band L is fed by means of the gear wheel 7, the toothed wheel 6, the free wheel 11, the toothed wheel 10, the pinion 12, the toothed roller 13 and the support roller 14 pressed against this toothed roller by the action of the spring 16 which acts on the rocking lever 31 and the connecting rod 15.

The band L advances through the guillotine cutting system 27, and through one of the openings 39 or 40 of the twister 35 to the hinged guide hook 17. It is noted that during this phase, the twister remains in the desired position due to the magnetic indexing device 46, 47.

The band L finishes its course by passing through the second opening 40 or 39 of the twister 35 and becoming engaged in the blind hole 43. At this moment, the cam 33 of the toothed wheel 10 encounters the free arm 31a of the rocking lever 31, causing the pivoting of the lever to counteract the opposing action of the spring 16. The pivoting of the lever 31 causes:

by means of the connecting rod 15, the retraction of the support roller 14 and, consequently the de-coupling of the elements 13, 14 of the system for advancing the band;

by means of the connecting rod 15 and the lever 28, the rotation of the knife 27b of the guillotine cutting system 27 which ensures the, i.e., cutting, of the initial portion L1 of the band L, which detached initial portion L1 constitutes the future tie A (see e.g. FIG. 1).

It is noted that during this phase of the cycle, the free wheel 11 is active, while the free wheel 38 is in the "free" or inactive state.

At the end of this phase, the geared motor changes its direction of rotation, and the free wheel 11 passes into the "free" or inactive state, while the free wheel 38 becomes active. The passage of the free wheel 11 into the "free" state causes the deactivation of the advancement system 13–14, the guillotine 27 and the guide hook 17.

The twister 35 is driven in rotation by means of the gear wheel 7, the toothed wheel 6, the pinion 37 and the free wheel 38. From the information transmitted by the microsensor 58, the microprocessor card performs a count of the number of turns which twist the tie around the shoot S and the supporting wire F. The number of turns can be adjusted by the operator at any time by means of the selector 48, in order to obtain the optimum tightening of the tie.

It is noted that due to the shape designed for the openings 39, 40 of the twister 35, the two end strands of the sectioned portion of the band L1 are first brought together by being pressed between the rear surface of the twister and the flat surface of the fixed part 41, which facilitates the twisting process.

After the execution of the twisting, the geared motor 4 again changes its direction of rotation.

The cam 33 of the gear wheel frees the lever 31 which, by means of the spring 16, allows the return of the support roller 14 against the toothed roller 13 and the opening of the guillotine cutting system 27, so that a new initial portion of the band is advanced in the direction of the hinged guide 17 until it nears the free end 17b of this guide. The cam 34 of the toothed wheel 10 then rocks the lever 23, ensuring the pivoting of the guide 17 and the opening of the hook 17–18, counter to the opposing action of the spring 25. The device is then ready to execute a new tie.

A particularly advantageous application of the invention to the tying of vines has been described, but it is obvious that the tying gun according to the invention can have numerous other applications in which it might prove desirable to place ties in order to connect two or more than two elements or to re-close part of an object (closure of bags, for example).

The instant application is based upon French Patent Application No. 95.10929, filed on Sep. 12, 1995, the disclosure of which is hereby expressly incorporated by reference thereto in its entirety and the priority of which is claimed under 35 USC 119.

Although the invention has been described with reference to particular means, materials, and embodiments, it is to be understood that the invention is not limited to the particulars expressly disclosed, but the invention extends to all equivalents within the scope of the claims that follow.

What is claimed is:

1. An apparatus for placing ties comprising:

a feeding system for feeding an initial portion of a filiform band issuing from a supply source from an upstream position to a downstream position;

a rotatable twisting device disposed at a front part of the apparatus, said twisting device comprising a first opening and a second opening for engaging two parts of the initial portion of the band;

a cutting system disposed upstream from one of said first and second openings of the twisting device;

a hinged guide equipped with a guide groove disposed at a front end of the apparatus, said hinged guide having an outlet, said outlet of said hinged guide being mounted for movement into an activated position opposite said second opening of said twisting device; and a driving system comprising a single electric motor capable of movement in two directions of rotation;

a transmission system comprising a first clutch device operatively connecting said driving system to said feeding system, said cutting system and said hinged guide and a second clutch device operatively connecting said driving system to said twisting device, the first and second clutch devices capable of being alternately active or inactive such that;

when said first clutch device is active, the first clutch device ensures communication of the movement of said single motor to said feeding system, to said hinged guide, and to said cutting system, while the second clutch device does not transmit any motor movement to said twisting device: for advancing the band by means of said feeding system, for allowing movement of said hinged guide into the activated position opposite the second opening of said twisting device, and for cutting the band by means of said cutting system to create a tie, while said twisting device is stopped; and when said second clutch device is active, the second clutch device transmits motor movements to said twisting device, while the first clutch does not transmit any motor movement to any one of said feeding system, said hinged guide, and said cuffing system; for driving said twisting device in rotation for twisting the tie, while said feeding system, said hinged guide, and said cutting system are de-activated.

2. An apparatus according to claim 1, further comprising:

a hooked tip immovably disposed at the front end of the apparatus, said hooked tip defining an opening for receiving an object to be tied; and means for mounting said hinged guide for pivoting around said opening.

3. An apparatus according to claim 2, wherein:

said hooked tip comprises walls defining a volume;

said hinged guide is mounted so as to be housed entirely within said volume when said hinged guide is moved from said activated position to a de-activated position away from said second opening of said twisting device.

4. An apparatus according to claim 1, wherein:

said two clutch devices are constituted by free wheels.

5. An apparatus according to claim 1, further comprising:

a body having a fixed portion, said fixed portion of said body including two substantially parallel passages, one of said passages being placed in correspondence with an outlet of said cutting system, said passages being positioned substantially parallel to an axis of rotation of said twisting device and disposed so as to be diametrically opposed relative to said axis, said first and second openings of said twisting device being adapted to be aligned opposite said passages.

6. An apparatus according to claim 1, wherein:

said cutting system comprises a guillotine device mounted for rotation, said guillotine device including a fixed element and a rotating element, said rotating element being mounted for rotation with limited amplitude around said fixed element, said rotating element being adapted to occupy two positions: a first position in which an opening is created for allowing passage of the band through said guillotine device; and a second position in which respective edges of said fixed element and said movable element cooperate in performing a cutting of the band.

7. An apparatus according to claim 1, further comprising:

a magnetic indexing system for ensuring a correct positioning of said twisting device when the second clutch device is inactive.

8. An apparatus according to claim 7, wherein:

said magnetic indexing system comprises at least one magnet affixed to a rear part of said twisting device and at least one magnet immovably positioned on a fixed part of a body of the apparatus.

9. An apparatus according to claim 1, wherein:

said feeding system comprises a pair of rollers, said driving system being capable of driving at least one of said rollers, said one of said rollers being equipped with peripheral teeth for simultaneously feeding the band and perforating a covering of the band.

10. An apparatus according to claim 9, wherein:

said transmission system comprises a toothed wheel, said first clutch device being for rotatably driving the toothed wheel, said toothed wheel being in engagement with said motor-driven roller for advancing the band, said toothed wheel being equipped, on each of opposite sides, with a cam, said cams being offset at an angle, one of said cams acting on a device for de-activating the feeding system and for operating said cutting system, and the other of said cams acting on a device for opening said hinged guide.

11. An apparatus according to claim 10, wherein:

said device for de-activating said feeding system and for operating said cutting system comprises a rocking lever, said rocking lever having one arm placed in a path of one of said cams of said toothed wheel and being linked, by means of a hinge, to one end of a connecting rod, said connecting rod supporting, on an intermediate part, a roller of said feeding system, and being linked at an opposite end by means of a hinge to a lever integral in rotation with a rotating knife of said cutting system, and a spring for returning said rocking lever and said connecting rod to a position in which said rollers ensure the feeding of the band and said cutting system allows passage of the band.

12. An apparatus according to claim 10, wherein:

said device for opening said hinged guide comprises a rocking lever, said rocking lever having an arm positioned in a path of one of said cams of said toothed wheel, said rocking lever being linked by means of a hinge to a connecting rod, said connecting rod being linked, by an opposite end of said connecting rod and by means of a further hinge, to a further lever integral with said hinged guide.

13. An apparatus according to claim 12, further comprising:

a body for housing parts of the apparatus; and a spring for ensuring pivoting of said hinged guide into a closed position, said spring being mounted around an anterior portion of said connecting rod and being affixed, by means of one end of said spring, against a portion of said body, and being affixed, by means of an opposite end of said spring, against a collar affixed on said anterior portion of said connecting rod.

14. An apparatus according to claim 10, wherein:

said cams are angularly offset with respect to said toothed wheel so that said feeding system is operated before said means for pivoting said hinged guide into an open de-activated position, so that part of the initial portion of the band is advanced into said hinged guide before an opening of said hook.

15. An apparatus according to claim 1, further comprising:

a body having a fixed portion, said fixed portion of said body including two substantially parallel passages, one of said passages being placed in correspondence with an outlet of said cutting system, said passages being positioned substantially parallel to an axis of rotation of said twisting device and disposed so as to be diametrically opposed relative to said axis, said first and second openings of said twisting device being adapted to be aligned opposite said passages.

16. An apparatus according to claim 15, wherein:

said openings of said twisting device have an elongated curved shape extending in a direction toward a center of said twisting device, with respect to a direction of rotation of said twisting device.

17. An apparatus according to claims 15, wherein:

said twisting device has a rear surface disposed a short distance from the flat surface of a fixed part of a body of the apparatus.

18. An apparatus according to claim 1, further comprising:

a microprocessor card for ensuring control of a complete operating cycle of the apparatus.

19. An apparatus according to claim 18, further comprising:

a body for housing parts of the apparatus, said body including a handle for gripping by a user; and said microprocessor card is housed in said handle.

20. An apparatus according to claim 18, wherein:

said driving system comprises a motor-driven roller; and said transmission system comprises a toothed wheel in rotatable driving connection with said motor-driven roller for advancing the band;

the apparatus further comprising microsensors linked to said microprocessor card for determining a position of said twisting device and advancement of the band, one of said microsensors being disposed opposite a path of magnets carried by said toothed wheel and a second of said microsensors being disposed opposite a path of at least one magnet carried by a rear part of said twisting device.

21. An apparatus according to claim 20, wherein:

said microsensors are Hall-effect microsensors.

22. An apparatus according to claim 18, further comprising:

a selector for ensuring a predetermined rotation of said twisting device for causing a predetermined amount of twisting of a tie.

23. An apparatus according to claim 22, further comprising:

a body for housing parts of the apparatus, said body including a handle for gripping by a user, wherein said selector is a control member positioned on said handle, said control member being movable to any of a plurality of positions for setting any of a plurality of predetermined number of twists of a tie.

24. An apparatus according to claim 1, further comprising:

means for receiving a reel of said band, said means comprising a case adapted to be affixed to a belt and an axle for receiving said reel; and a braking device for resisting a free rotation of said reel positioned on said axle.

25. An apparatus according to claim 1, in combination with said supply source.

26. An apparatus according to claim 1, further comprising:

a mounting for pivoting the hinged guide from an open position for receiving an object to be tied, to the operating position, the apparatus further comprising a spring for causing the pivoting of the hinged guide into the operating position.

27. An apparatus for placing ties comprising:

a feeding system for feeding an initial portion of a filiform band issuing from a supply source from an upstream position to a downstream position;

a rotatable twisting device disposed at a front part of the apparatus, said twisting device comprising a first opening and a second opening for engaging two parts of the initial portion of the band;

a magnetic indexing system for ensuring a correct positioning of said twisting device;

a cutting system disposed upstream from one of said first and second openings of the twisting device;

a hinged guide equipped with a guide groove disposed at a front end of the apparatus, said hinged guide having an outlet, said outlet of said hinged guide being mounted for movement into an activated position opposite said second opening of said twisting device; and a driving system and a transmission system operatively connected to said feeding system, said twisting device, said cutting system, and said hinged guide, said driving system and transmission system being adapted to be alternately active and inactive for performing, respectively, the following:

advancing the band by means of said feeding system; allowing movement of said hinged guide into said activated position opposite said second opening of said twisting device; and cutting the band by means of said cutting system, while said twisting device is stopped to create a tie; and driving said twisting device in rotation, while said feeding system, said hinged guide, and said cutting system are de-activated for twisting a tie.

28. An apparatus according to claim 27, further comprising:

a hooked tip immovably disposed at the front end of the apparatus, said hooked tip defining an opening for receiving an object to be tied;

means for mounting said hinged guide for pivoting around said opening.

29. An apparatus according to claim 28, wherein:

said hooked tip comprises walls defining a volume;

said hinged guide is mounted so as to be housed entirely within said volume when said hinged guide is moved from said activated position to a de-activated position away from said second opening of said twisting device.

30. An apparatus according to claim 27, further comprising:

a body having a fixed portion, said fixed portion of said body including two substantially parallel passages, one of said passages being placed in correspondence with an outlet of said cutting system, said passages being positioned substantially parallel to an axis of rotation of said twisting device and disposed so as to be diametrically opposed relative to said axis, said first and second openings of said twisting device being adapted to be aligned opposite said passages.

31. An apparatus according to claim 27, wherein:

said cutting system comprises a guillotine device mounted for rotation, said guillotine device including a fixed element and a rotating element, said rotating element being mounted for rotation with limited amplitude around said fixed element, said rotating element being adapted to occupy two positions: a first position in which an opening is created for allowing passage of the band through said guillotine device; and a second position in which respective edges of said fixed element and said movable element cooperate in performing a cutting of the band.

32. An apparatus according to claim 27, wherein:

said magnetic indexing system comprises at least one magnet affixed to a rear part of said twisting device and at least one magnet immovably positioned on a fixed part of a body of the apparatus.

33. An apparatus according to claim 27, further comprising:

a mounting for pivoting the hinged guide from an open position for receiving an object to be tied, to the operating position, the apparatus further comprising a spring for causing the pivoting of the hinged guide into the operating position.

34. An apparatus according to claim 33, wherein:

said feeding system comprises a pair of rollers, the apparatus further comprising a motor for driving at least one of said rollers, said one of said rollers being equipped with peripheral teeth for simultaneously feeding the band and perforating a covering of the band.

35. An apparatus according to claim 34, wherein:

said transmission system comprises a toothed wheel, the apparatus further comprising a clutch device for rotatably driving the toothed wheel, said toothed wheel being in engagement with said motor-driven roller for advancing the band, said toothed wheel being equipped, on each of opposite sides, with a cam, said cams being offset at an angle, one of said cams acting on a device for de-activating the feeding system and for operating said cutting system, and the other of said cams acting on a device for opening said hinged guide.

36. An apparatus according to claim 35, wherein:

said device for de-activating said feeding system and for operating said cutting system comprises a rocking lever, said rocking lever having one arm placed in a path of one of said cams of said toothed wheel and being linked by, by means of a hinge, to one end of a connecting rod, said connecting rod supporting, on an intermediate part, a roller of said feeding system, and being linked at an opposite end by means of a hinge to a lever integral in rotation with a rotating knife of said cutting system, and a spring for returning rocking lever and said connecting rod to a position in which said rollers ensure the feeding of the band and said cutting system allows passage of the band.

37. An apparatus according to claim 35, wherein:

said device for opening said hinged guide comprises a rocking lever, said rocking lever having an arm positioned in a path of one of said cams of said toothed wheel, said rocking lever being linked by means of a hinge to a connecting rod, said connecting rod being linked, by an opposite end of said connecting rod and by means of a further hinge, to a further lever integral with said hinged guide.

38. An apparatus according to claim 37, further comprising:

a body for housing parts of the apparatus; and a spring for ensuring pivoting of said hinged guide into a closed position, said spring being mounted around an anterior portion of said connecting rod and being affixed, by means of one end of said spring, against a portion of said body, and being affixed, by means of an opposite end of said spring, against a collar affixed on said anterior portion of said connecting rod.

* * * * *